United States Patent
Wang et al.

(10) Patent No.: US 10,997,597 B2
(45) Date of Patent: *May 4, 2021

(54) ELECTRONIC TRANSACTIONAL DATA BASED PREDICTIVE SYSTEM

(71) Applicant: Visa International Service Association, San Francisco, CA (US)

(72) Inventors: Guangyu Wang, Foster City, CA (US); Kebin Lu, Foster City, CA (US); Sang Hwang, Foster City, CA (US); Debesh Kumar, Foster City, CA (US); Preeti Jindal, Foster City, CA (US); Lawson Lau, Foster City, CA (US); Melissa Lawu Tran, Foster City, CA (US); Japneet Kaur Giglio, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,983

(22) Filed: Jul. 12, 2019

(65) Prior Publication Data

US 2020/0005314 A1 Jan. 2, 2020

Related U.S. Application Data

(63) Continuation of application No. 15/428,909, filed on Feb. 9, 2017, now Pat. No. 10,387,883.

(51) Int. Cl.
| | | |
|---|---|---|
| G06Q 20/40 | (2012.01) | |
| G06Q 40/00 | (2012.01) | |
| G06N 20/00 | (2019.01) | |
| G06N 7/00 | (2006.01) | |
| G06N 5/00 | (2006.01) | |

(52) U.S. Cl.
CPC ......... *G06Q 20/4016* (2013.01); *G06N 5/003* (2013.01); *G06N 7/005* (2013.01); *G06N 20/00* (2019.01); *G06Q 40/12* (2013.12)

(58) Field of Classification Search
CPC .................................................. G06Q 20/4016
See application file for complete search history.

(56) References Cited

U.S. PATENT DOCUMENTS

| | | | |
|---|---|---|---|
| 7,383,215 B1 * | 6/2008 | Navarro | G06Q 30/02 705/30 |
| 7,831,467 B1 | 11/2010 | Lefebvre | |
| 8,438,091 B1 * | 5/2013 | Berman | G06Q 40/00 705/36 R |
| 8,688,557 B2 | 4/2014 | Rose | |
| 2004/0111363 A1 | 6/2004 | Trench | |
| 2009/0276289 A1 * | 11/2009 | Dickinson | G06Q 10/063 705/7.29 |

(Continued)

OTHER PUBLICATIONS

"MoM, QoQ and YoY comparisons", Nov. 19, 2016, HowTo. ComMetrics (Year: 2016) (Year: 2016).*

"How to Read a 3×3 Matrix", Jan. 17, 2010, andynicholas.com (Year: 2010) (Year: 2010).*

(Continued)

*Primary Examiner* — Florian M Zeender
*Assistant Examiner* — Vanessa Deligi
(74) *Attorney, Agent, or Firm* — Loeb & Loeb LLP

(57) ABSTRACT

Past electronic records may be studied using a computer learning algorithm in order to make predictions of future use of the electronic accounts.

20 Claims, 10 Drawing Sheets

(56) References Cited

U.S. PATENT DOCUMENTS

| | | | | |
|---|---|---|---|---|
| 2009/0307074 | A1* | 12/2009 | Sharma | G06Q 30/0224 |
| | | | | 705/14.25 |
| 2011/0166988 | A1* | 7/2011 | Coulter | G06Q 40/02 |
| | | | | 705/38 |
| 2011/0313835 | A1* | 12/2011 | Falkenborg | G06Q 30/0224 |
| | | | | 705/14.25 |
| 2011/0313900 | A1* | 12/2011 | Falkenborg | G06Q 30/0202 |
| | | | | 705/30 |
| 2012/0078813 | A1* | 3/2012 | Rose | G06Q 40/00 |
| | | | | 705/36 R |
| 2012/0166264 | A1* | 6/2012 | Shum | G06Q 30/02 |
| | | | | 705/14.17 |
| 2013/0124258 | A1* | 5/2013 | Jamal | G06Q 30/0201 |
| | | | | 705/7.29 |
| 2014/0067461 | A1 | 3/2014 | Zhang | |

OTHER PUBLICATIONS

"How to Read a 3×3 Matrix", Jan. 17, 2010, andynicholas.com (Year: 2010).*
"How to Read a 3×3 Matrix", Jan. 17, 2010, andynicholas.conn (Year: 2010) 13 pages.
"MoM, QoQ and YoY comparisons", Nov. 19, 2016, HowTo.ComMetrics (Year: 2016) 4 pages.
Notice of Allowance dated Apr. 11, 2019 for U.S. Appl. No. 15/428,909 (pp. 1-10).
Office Action dated Oct. 3, 2018 for U.S. Appl. No. 15/428,909 (pp. 1-31).
PCT International Search Report and Written Opinion for cited in ISR for PCTUS2018017345 dated Apr. 24, 2018, 14 pages.
International Preliminary Report on Patentability for Application No. PCT/US2018/017345, dated Aug. 22, 2019, 8 pages.

* cited by examiner

Attrition Campaigns

Run engagement campaigns to retain high value cards at high risk of attrition

Growth Campaigns

Run marketing campaigns to:

1) Protect high spenders at low risk of attrition
2) Grow low spenders at low risk of attrition

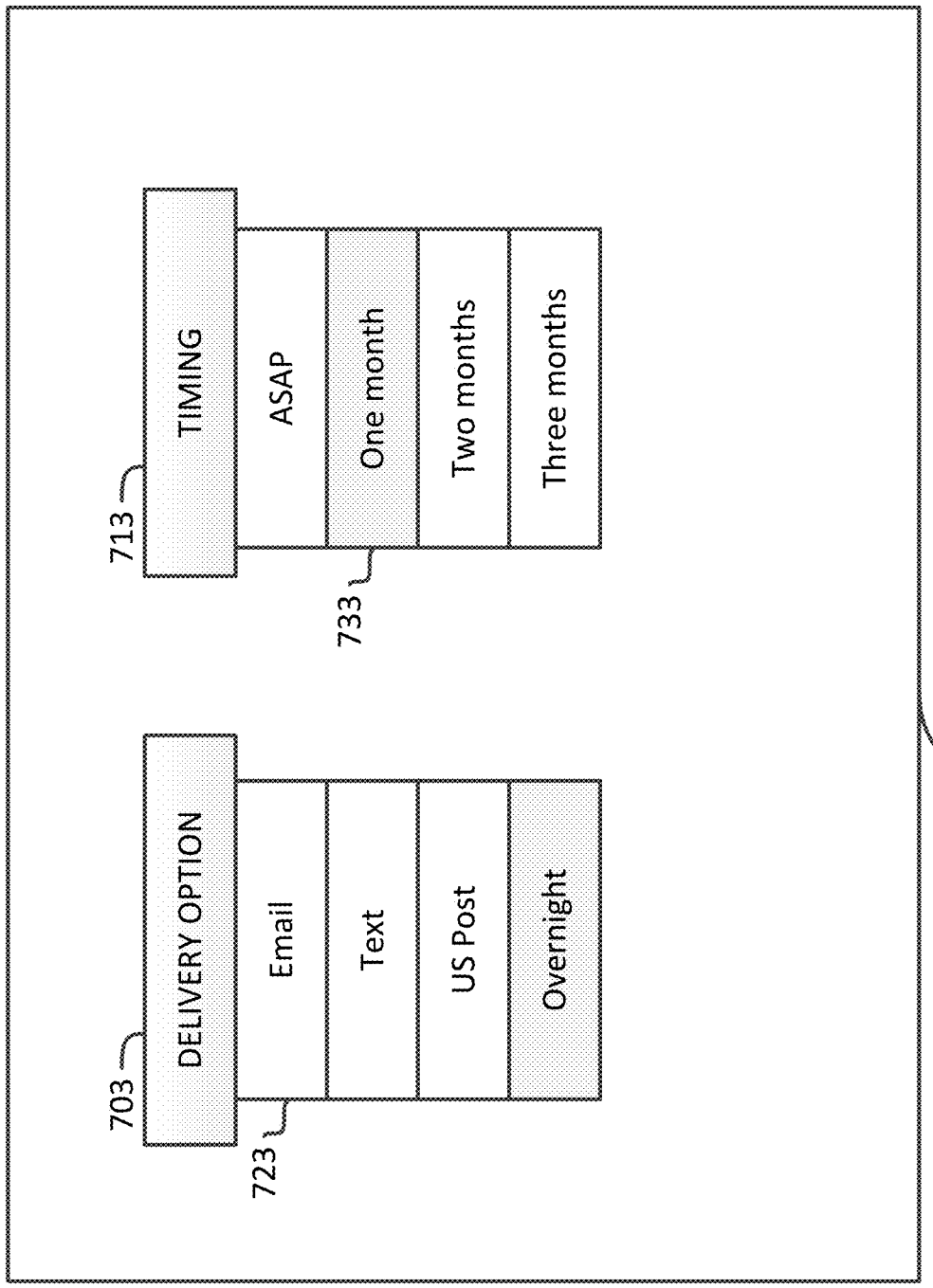

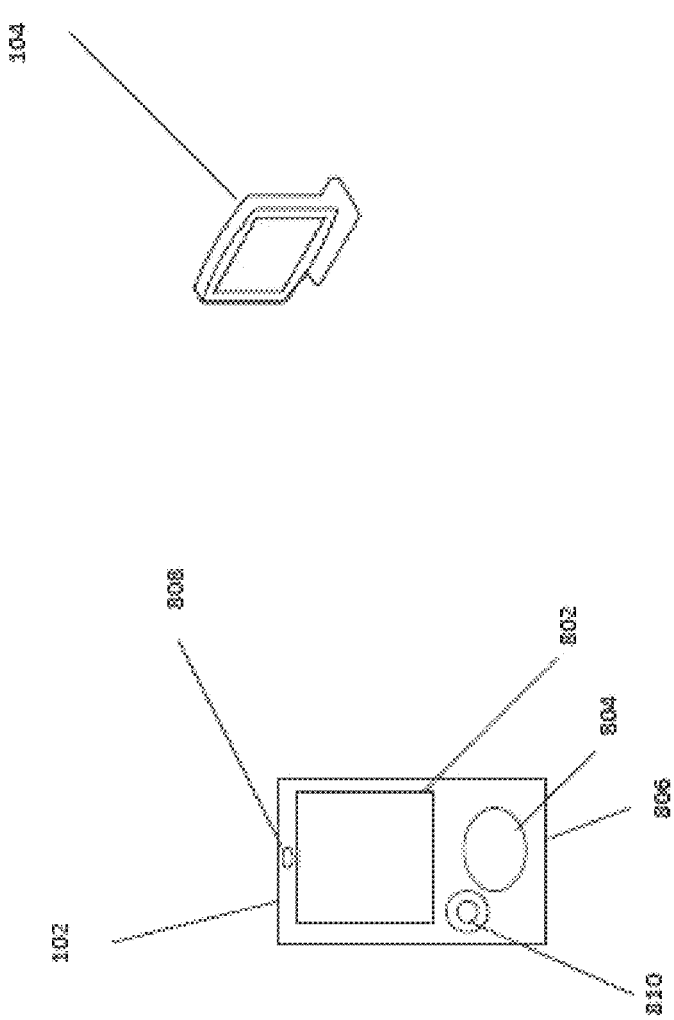

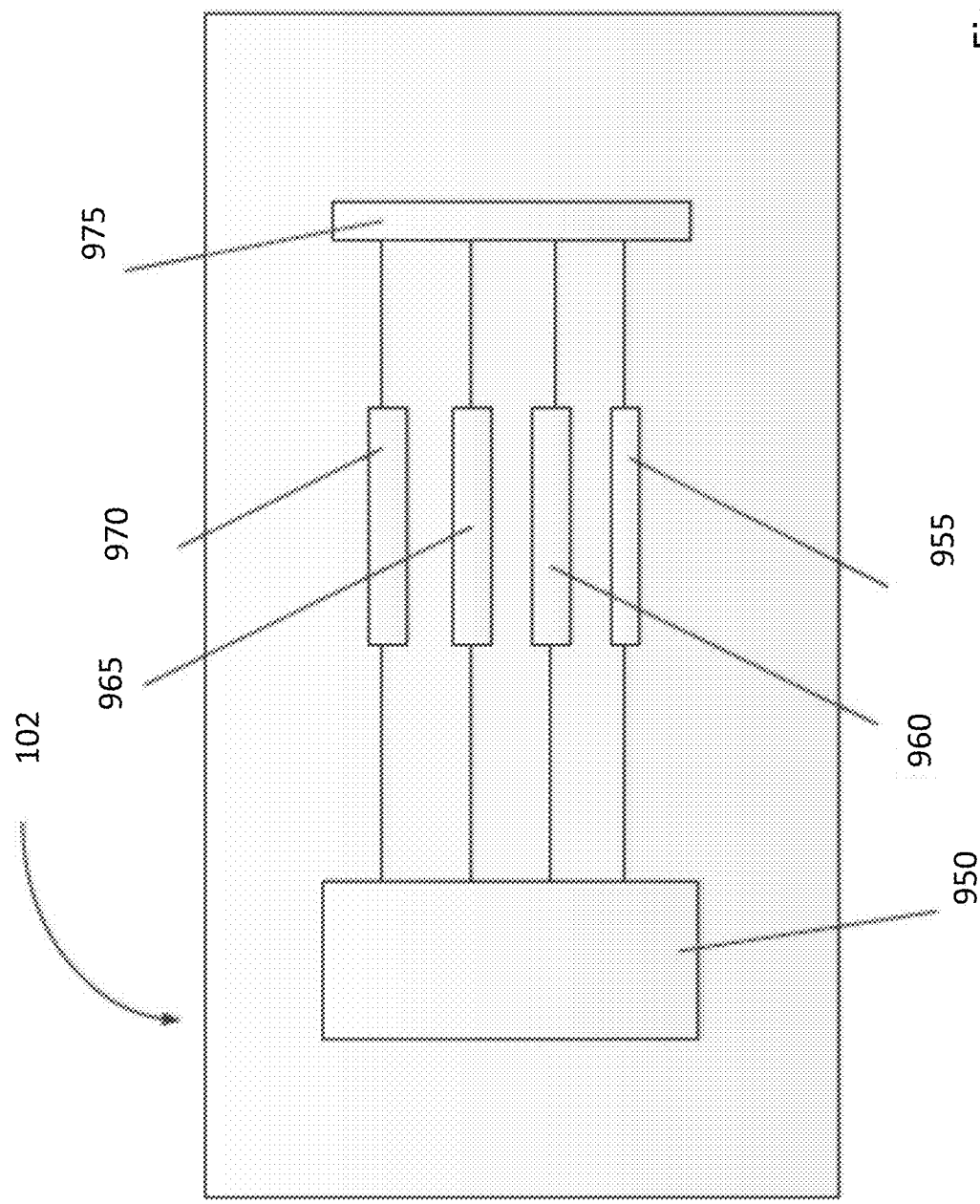

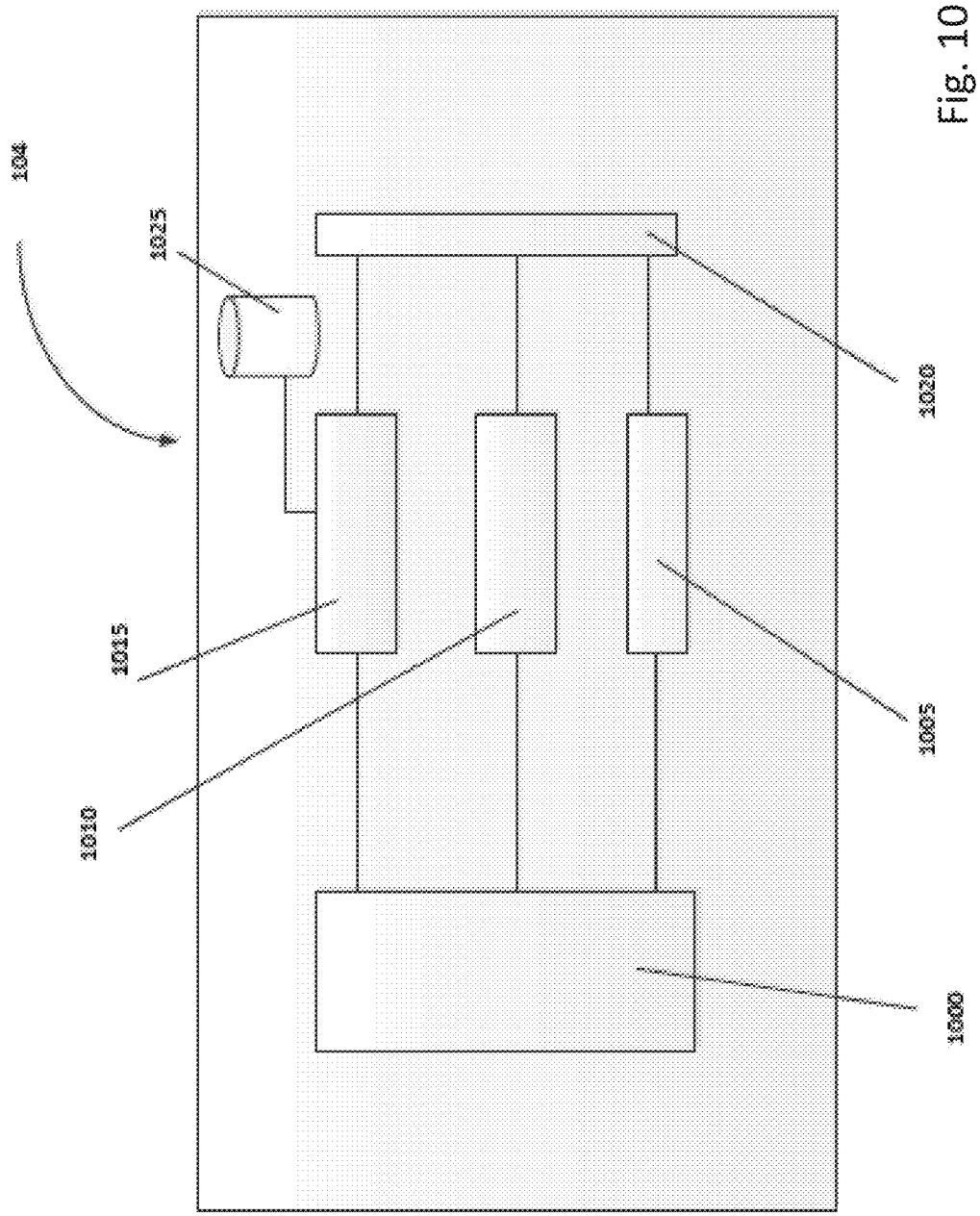

US 10,997,597 B2

ELECTRONIC TRANSACTIONAL DATA BASED PREDICTIVE SYSTEM

CROSS-REFERENCE TO RELATED APPLICATIONS

This application is a continuation of U.S. patent application Ser. No. 15/428,909, filed Feb. 9, 2017, the disclosure of which is incorporated by reference herein.

BACKGROUND

Electronic accounts including electronic accounts for payments, are useful for keeping track of data and eliminating the use of paper. The electronic records may be reviewed and studied. In some instances, people stop using electronic accounts. The issuer of these electronic accounts may be distressed as the issuer would like the use of the electronic accounts to continue. By studying past patterns of electronic accounts which have lapsed, predictions may be made about accounts map lapse in the future.

SUMMARY

Past electronic records may be studied in a prescribed manner in order to make predictions of future use of the electronic accounts. In one embodiment, accounts may be studied for signs of attrition and the accounts may be studied for transaction reductions. The accounts may be given a value based on the likely attrition and the likely transaction reductions. The accounts may be broken into groups by value and the accounts with the highest value may be studied using the using attrition ranking and transaction reduction ranking in the hope of finding the most valuable accounts that are most likely to stop being used.

BRIEF DESCRIPTION OF THE DRAWINGS

FIG. 7 illustrates a user interface to select a delivery option and timing for a campaign;

FIG. 8 illustrates a portable computing device and a server type computing device;

FIG. 9 illustrates elements of a sample computer system; and

FIG. 10 illustrate elements of a sample computer system with a database.

SPECIFICATION

Figure 1:
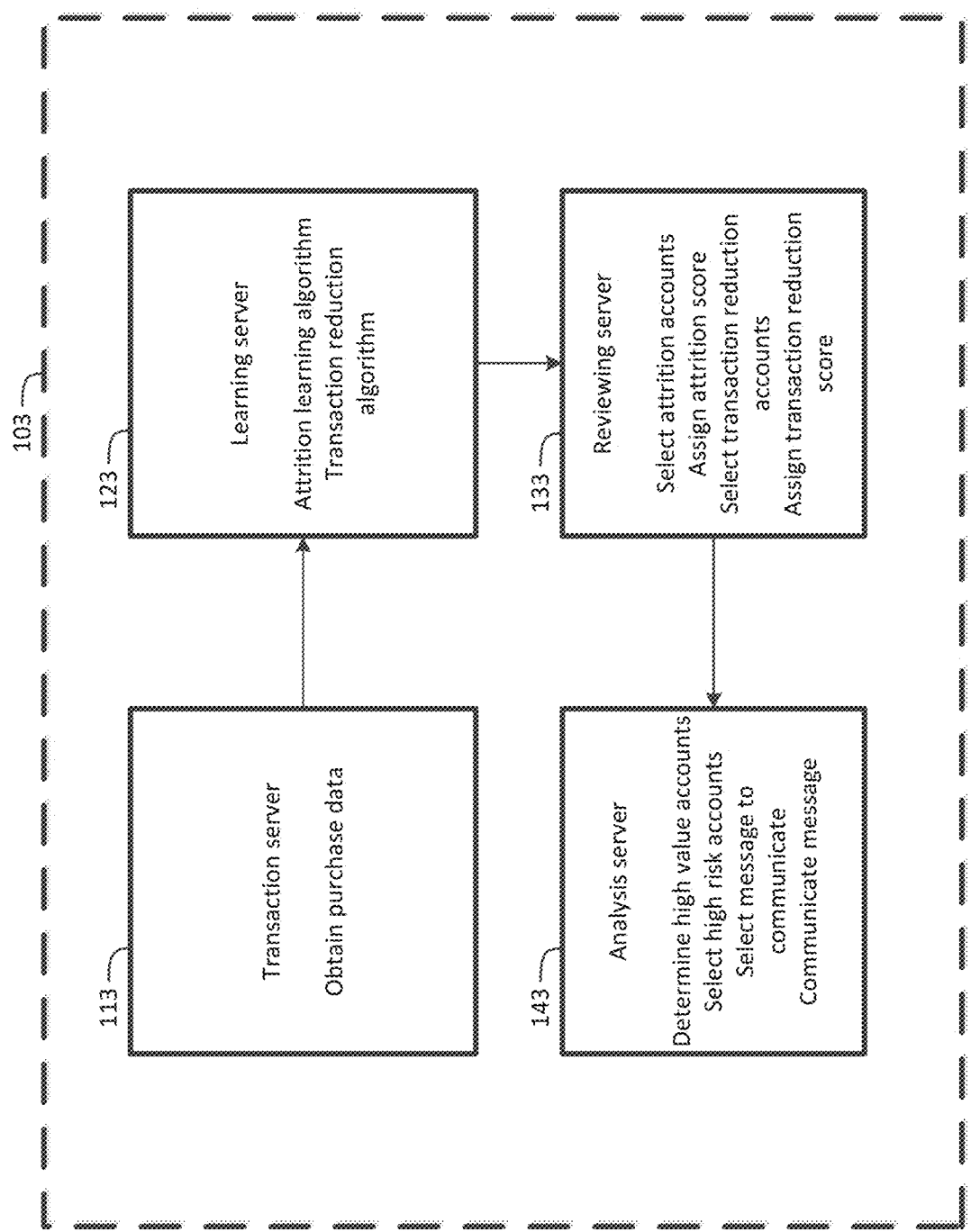
FIG. 1 illustrates a sample configuration of servers that make up the computer system.

The present disclosure now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the example embodiments may take the form of an entirely hardware embodiment, an entirely software embodiment, or an embodiment combining software and hardware aspects. The following detailed description is, therefore, not to be taken in a limiting sense. The servers may be in a single server, a server with multiple processors or in processors that are remote but are in communication with each other. The processors may be physically configured as hardware or may be physically configured according to computer executable instructions which physically configure the processor to perform computer operations as described herein.

Attrition is a situation when a user stops using an electronic payment device such as a credit card account or a virtual wallet. Issuers of electronic payment devices want user to use a specific device because the issuer often receives a portion of each transaction. When people stop using a payment device, the portion of each payment stops. Thus, it would be useful to know when an electronic payment user is preparing to stop using a payment device.

Similarly, spending slowing is a situation when a user slowly stops using an electronic payment device such as a credit card account or a virtual wallet. Issuers of electronic payment devices want user to use a specific device because the issuer often receives a portion of each transaction. When people slowly refrain from using a payment device, the portion of each payment stops. Thus, it would be useful to know when an electronic payment user if preparing to stop using a payment device.

Trying to predict when a user is going to stop using a payment device or reduce spending on a particular payment device is a technical problem as the amount of data is enormous, constantly changing and can lead to contradictory conclusions. Issuers of electronic payment devices have tried to review past data to determine patterns and responses to the patterns without such success. The described system, method and hardware attempt to use the power of computers to learn to analyze past data from a variety or perspectives to determine when a user is likely to stop using an electronic payment device. In addition, a message of an enticement may be communicated which may prod the user to return to using the electronic payment device.

In one embodiment, a system of servers is used to perform machine learning to determine the most valuable customers that are likely to stop using the electronic payment device. As illustrated in FIG. 1, a computer system 103 for determining usage change patterns for electronic accounts is disclosed. The system 103 may include a transaction server 113, a learning server 123, a reviewing server 133 and an analysis server 143. As mentioned previously, the servers may be separate or may be in a single server with a single or different processors being physically configured according to the appropriate computer executable instructions.

The transaction server 113 may be physically configured to obtain data and that data may be related to past purchases by an electronic account. The electronic account may be a credit card account, a debit account, a merchant account, a peer to peer payment system or any other appropriate payment platform where records are kept of transfers of value. The payment data may be useful in an analysis to determine signs or elements that may indicate that an electronic payment device is not going to be used in the future. The transaction server 113 may belong to a card issuer such as Visa or MasterCard or it may belong to other parties to an electronic transaction such as a card bank, a fraud checker, a clearing bank or a merchant.

Figure 2:
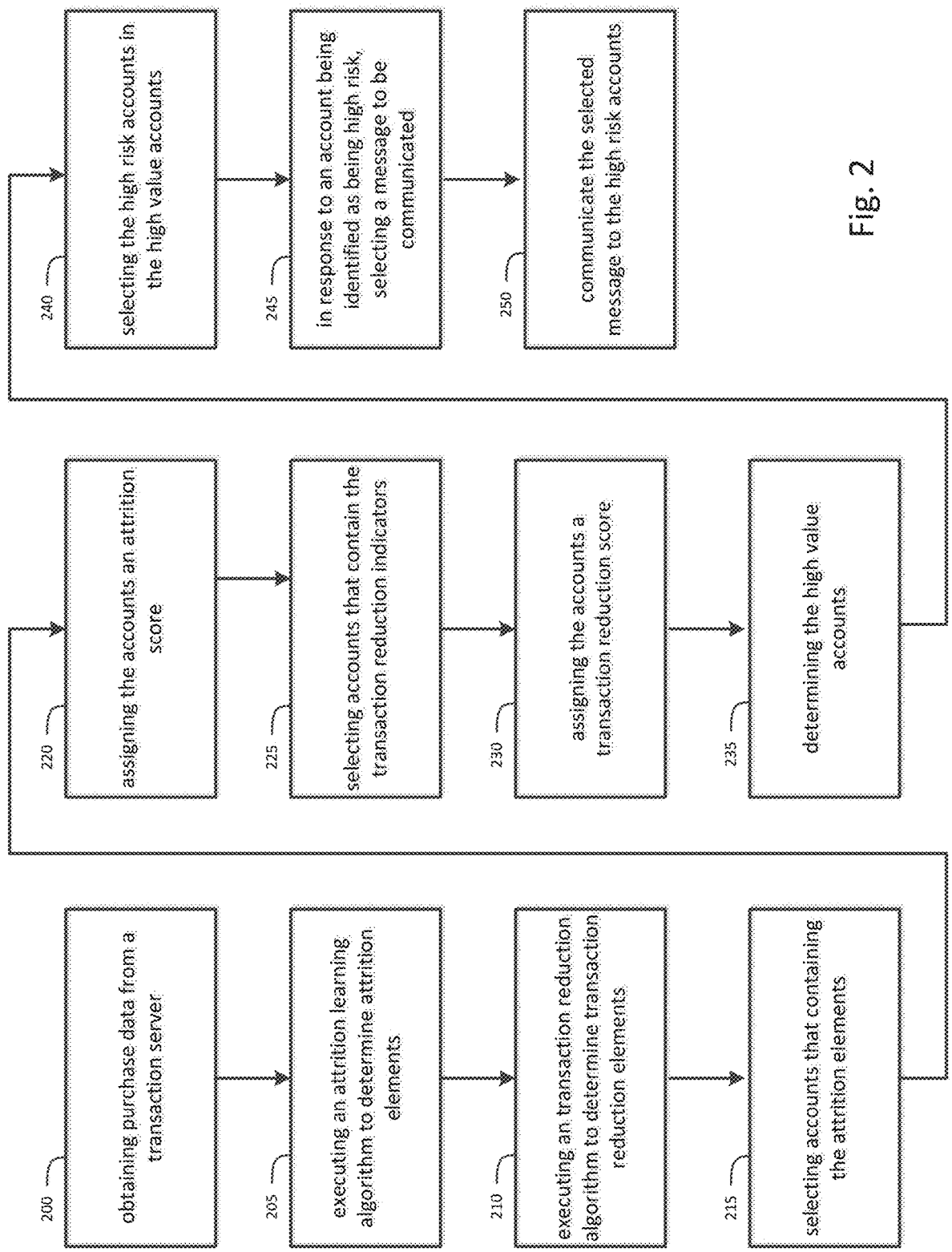
FIG. 2 illustrates a flowchart of steps of a method in accordance with the claims.

As indicated in FIG. 2, which may be a flow chart of the blocks of a method executed by the system 103, at block 200, the transaction server 113 may be built and designed to handle a large number of transactions in a short period of time and to store an enormous amount of data in a secure manner. The learning server 123 may be physically configured to execute one or more computer learning algorithms. A sample learning algorithm is Treenet which uses a set of data broken into sections. Some sections are used to train the algorithm and other sections are used to test the algorithm and then the sections rotate and sections that were used to test are used to train and sections that were used to train are used to test the algorithm. In this way, the algorithm can learn the desire information from the data and test the learning aspect of the algorithm.

As noted at block 205 (FIG. 2), the learning server 123 may execute an attrition learning algorithm to determine attrition elements that predict likelihood of attrition in near future. At a high level, accounts that have attrition may be known. By studying data related to that account before the As an example, the learning algorithm of possible attrition may review a plurality of elements during a study time period of n month intervals wherein the elements are selected from the group:
total present value in month n of the study period;
percent of change in transactions for month n of study period over the last month of previous time period;
percent of change in transaction for month n over the first month during study period;
month-over-month change in everyday present value for month n over month 1 during the study period;
total online present value for the 2nd qtr. of the study period;
percent of change in recurring present value for month n−2 of study period over the month n−2 of previous study period;
total number of decline during the study window;
month-over-month change in present value month n in the study period over month n of the prior n months period;
total number of decline during the study window;
month-over-month change in present value month n in the study period over month n of the prior n months period;
total monthly charge count during the study period;
month-over-month change in transaction month n in the study period over month n of the prior n months period;
percent of change in transaction first month of study period over the month n of previous n months; and
month-over-month change in recurring transaction for month n in the study period over month n of the prior n months period.

Of course, other measures and elements may be reviewed.

The elements may be stored in a known format along with the score assigned by the algorithm such as:

| Predictor | Score | Description | Sign |
|---|---|---|---|
| SPM6 PV | 100.00 | Total PV in mont 6 of the study period | − |
| PCT_TXN_CHG_MOM_SPM6 | 72.26 | % of change in Txn for the month 6 of study period over the month 6 of previous 6 months | − |
| PCT_TXN_CHG_6M_1M | 58.40 | % of change in txn for the last month over the first month during study period | − |
| MOM_EVDAY_PV_CHG_SPM6_SPM1 | 42.53 | Month-over-Month change in Everyday PV for Month 6 over month 1 during the study period | − |
| SP_Q2_ONLINE_PV | 41.52 | Total Online PV for the 2nd qtr of the study period | − |
| PCT_RECUR_PV_CHG_MOM_SPM4 | 41.51 | % of change in recurring PV for month 4 of study period over the month 4 of previous 6 months | − |
| DEC STUD | 39.00 | Total number of decline during the study window | + |
| PCT_TXN_CHG_MOM_SPM5 | 38.10 | Month-over-Month change in PV Month 6 in the study period over month 6 of the prior 6 months period | − |
| MCGCNT SP | 34.02 | Total MCG count during the study period | − |
| MOM_TXN_CHG_SPM6 | 33.37 | Month-over-Month change in TXN Month 6 in the study period over month 6 of the prior 6 months period | − |
| PCT_TXN_CHG_MOM_SPM1 | 31.14 | % of change in Txn for the month 1 of study period over the month 6 of previews 6 months | − |
| MOM_RECUR_TXN_CHG_SPM6 | 21.67 | Month-over-Month change in recurring TXN for Month 6 in the study period over month 6 of the prior 6 months period | − | account suffered attrition, elements may be determined that may assist in determining if an account will suffer attrition in the future. Once those elements are determined, the same elements may be studied for existing accounts to determine if attrition is likely in the existing accounts.

The score may indicate the value of the determined element in determining attrition. A higher score may indicate there is a more significant relationship between the element and the attrition on the account. Related, the data structure of the elements may be used to communicate the elements to a variety of interested parties in a known and predictable manner. Logically, application program interfaces (APIs) may be created which leverage the data structures to assist in further automating tasks, and create technological and communication efficiencies.

In application, machine learning software may be used to determine the elements that are useful in predicting attrition. As described above, Treenet is a sample machine learning program that may operate on the learning server 123 and may identify elements that were present when account suffered attrition in the past and may be useful to predict attrition in the future on existing clients.

Also as noted at block 210 (FIG. 2), the learning server 123 may execute a transaction reduction algorithm to determine transaction reduction elements that predict likelihood of transaction reductions in the near future. At a high level, accounts that have transaction reductions may be known. By studying data related to that account before the account suffered transaction reductions, elements may be determined that may assist in determining if an account will suffer transaction reductions in the future. Once those elements are determined, the same elements may be studied for existing accounts to determine if transaction reductions is likely in the existing accounts.

Some sample elements for slow spending may include:
change in everyday transaction on in 2 quarter vs first quarter during the study period;
percent change in transaction 2 quarter vs 1st quarter during the study period;
month over month change in transaction for month 6 of the study period;
month over month change in everyday transaction for month 6 of the study period;
month over month change in everyday transaction for month 5 of the study period;
number of decline during the study period; and
month over month change in online transaction for month 5 during the study period.

Of course, additional elements may be studied. The elements may be stored in a known format along with the score assigned by the algorithm such as:

faces (APIs) may be created which leverage the data structures to assist in further automating tasks.

In application, machine learning software may be used to determine the elements that are useful in predicting transaction reductions. As described above, Treenet is a sample machine learning program that may operate on the learning server 123 and may identify elements that were present when account suffered transaction reductions in the past and may be useful to predict transaction reductions in the future on existing clients.

In physical configuration, the learning server 123 may be optimized for machine learning. It may have more memory than a traditional server as machine learning algorithms may be more memory intensive that other applications. Similarly, the processor may be faster and require more cooling than a traditional processor as machine learning may be computationally intensive.

A reviewing server 133 physically configured to review accounts and assign values to the accounts which may be useful in assigning the accounts into classifications. As noted in block 215 (FIG. 2), the reviewing server may select accounts that containing the attrition elements determined to predict likelihood of attrition in the near future by the learning server 123 in block 205.

The reviewing server 133 may also assign the accounts an attrition score as noted in block 220. The score may indicate a likelihood that a specific account will suffer attrition. As an example, if there are 10 elements that may indicate attrition and a specific account has all ten, the attrition score may be at an extreme. Similarly, if a specific account only has one of the ten elements, the attrition score may be at a minimum.

As noted in block 225 (FIG. 2), the reviewing server 133 may select accounts that containing the transaction reduction elements determined to predict likelihood of transaction reductions in the near future by the learning server 123 in block 210. At block 230, the reviewing server 133 may assign the accounts a transaction reduction score. The score may indicate a likelihood that a specific account will suffer a spending reduction. As an example, if there are 10 elements that may indicate a spending reduction and a specific account has all ten, the spending reduction score may be at

| Predictor | Score | Description | Sign |
| --- | --- | --- | --- |
| QTR_EVDAY_TXN_CHG_SP | 100 | change in everyday transaction in 2nd qtr vs first qtr during the study period | − |
| PCT_TXN_CHG_QTRSP | 73.22 | % change in transaction 2nd qtr vs. 1st qtr during the study period | − |
| MOM_TXN_CHG_SPM6 | 73.18 | MOM change in transaction for month 6 of the study period | − |
| MOM_EVDAY_TXN_CHG_SPM6 | 60.25 | MOM change in everyday transaction for month 6 of the study period | − |
| MOM_EVDAY_TXN_CHG_SPM5 | 57.11 | MOM change in everyday transaction for month 5 of the study period | − |
| MOM_TXN_CHG_SPM5 | 54.17 | MOM change in transaction for month 5 of the study period | − |
| DEC_STUD | 45.27 | Number of decline during the study period | + |
| MOM_ONLINE_TXN_CHG_SPM5 | 24.65 | MOM change in online transaction for month 5 during the study period | − |

The score may indicate the value of the determined element in determining attrition. A higher score may indicate there is a more significant relationship between the element and the reduction in spending on the account. Related, the data structure of the elements may be used to communicate the elements to a variety of interested parties in a known and predictable manner. Logically, application program interan extreme. Similarly, if a specific account only has one of the ten elements, the spending reduction score may be at a minimum.

From a physical standpoint, the reviewing server may be physically configured to rapidly review a large number of accounts in a short period of time. The server may had additional RAM to assist in queuing the accounts to be reviewing. Similarly, the processor may have more speed than a traditional server much that it can quickly process large amounts of data.

An analysis server 143 may be part of the system 103 to assist in analyzing the determinations made by the learning server 123 and by the reviewing server 133 accounts. As noted at block 235, the analysis server may determine account that have a desire value associated with them. For example, if a payment account consistently is used for high monetary values, the account may be valuable to retrain. In another aspect, accounts that have low monetary values may be desired to be grown and the analysis server 143 may select those accounts. Logically, a user interface may be provided to allow a user to set the desired monetary value of the electronic account. In one embodiment, the analysis server 143 may seek out accounts that have an annual transaction value over a threshold.

Figure 3:
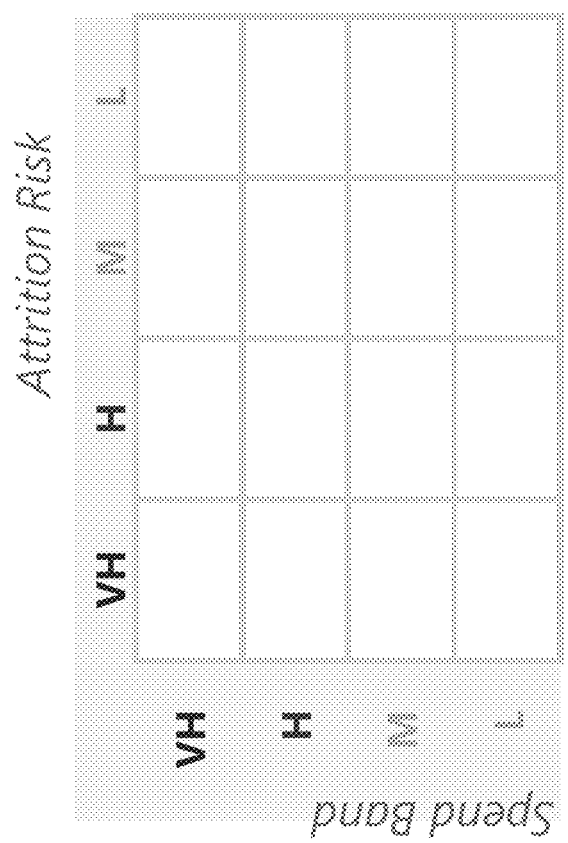
FIG. 3 illustrates a matrix that uses both attrition scores and spending scores to classify accounts.
Figure 4A:
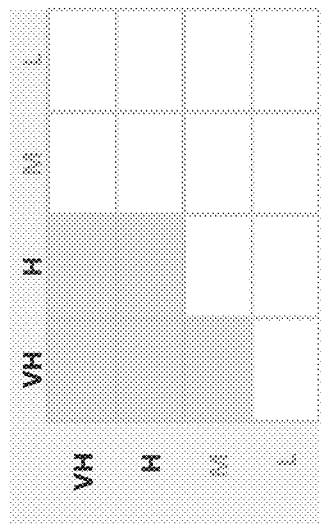
FIG. 4a illustrates a matrix created for retention identification.
Figure 4B:
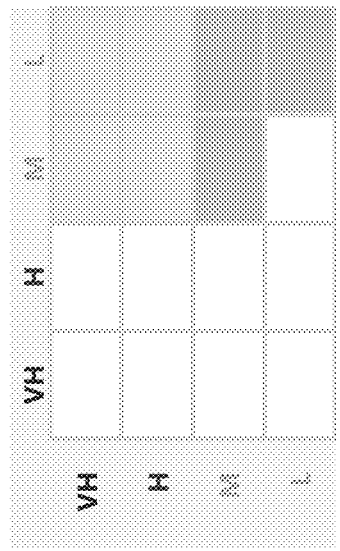
FIG. 4b illustrates a matrix created for growth identification.

At block 240, the analysis server 143 may review the selected high value (or low value) accounts to determine which have been determined by the reviewing server 133 to be at high risk of attrition and/or lower spending. In some embodiments, matrices are created to help visualize the accounts to be part of a campaign. FIG. 3 illustrates a matrix where accounts are classified based on the attrition risk and on the reduced spending risk. As illustrated in FIG. 4a, a variety of classifications of the accounts may be made based on the determined attrition elements and lower spending elements and the scores given by the analysis server. As yet another example, high value accounts that may have very high attrition risk and very high lowered spending risk may be selected for a campaign and those accounts may be in one corner of the matrix. As yet another example such as in FIG. 4b, a growth campaign may seek accounts that are low spenders but have a low likelihood of attrition as accounts that are likely to grow.

More specifically, the analysis server 143 may be physically configured to:

separate the accounts by spend amount into a plurality of spend levels based on spend;

separate the accounts by transaction reduction score into a plurality of reduction levels;

separate the accounts by attrition score into a plurality of attrition levels; and for each spend level, create a matrix with plurality attrition on a first axis, plurality of reductions levels on a second axis and spend levels on a third axis.

In response to an account being identified, at block 245 (FIG. 2) the analysis server 143 may select a message from a plurality of messages to be communicated to the electronic account holder. The message may be a type of enticement such as a higher credit limit, bonus rebates, higher percentage cash back, lower interest rates, etc. At block 250, the message may be communicate to the account holder.

In addition, the learning server 123 may determine other logistical aspects of communicating the message. The communication may be in a form preselected by the account holder or may be selected by the party performing the analysis. For example, the learning server may indicate that high value account holders respond better to physical letters than electronic messages. Similarly, the learning server 123 may indicate that the message will have the biggest impact if it is communicated within one month (or two months if one month is not possible) of the elements appearing in an account.

The system 103 may work on electronic accounts in general or the study may be more specific. For example, the system may just look at cards from a specific merchant. In other embodiments, the study may be issuer specific. As a result, the individual differences of the account holders may be taken into account.

Figure 5:
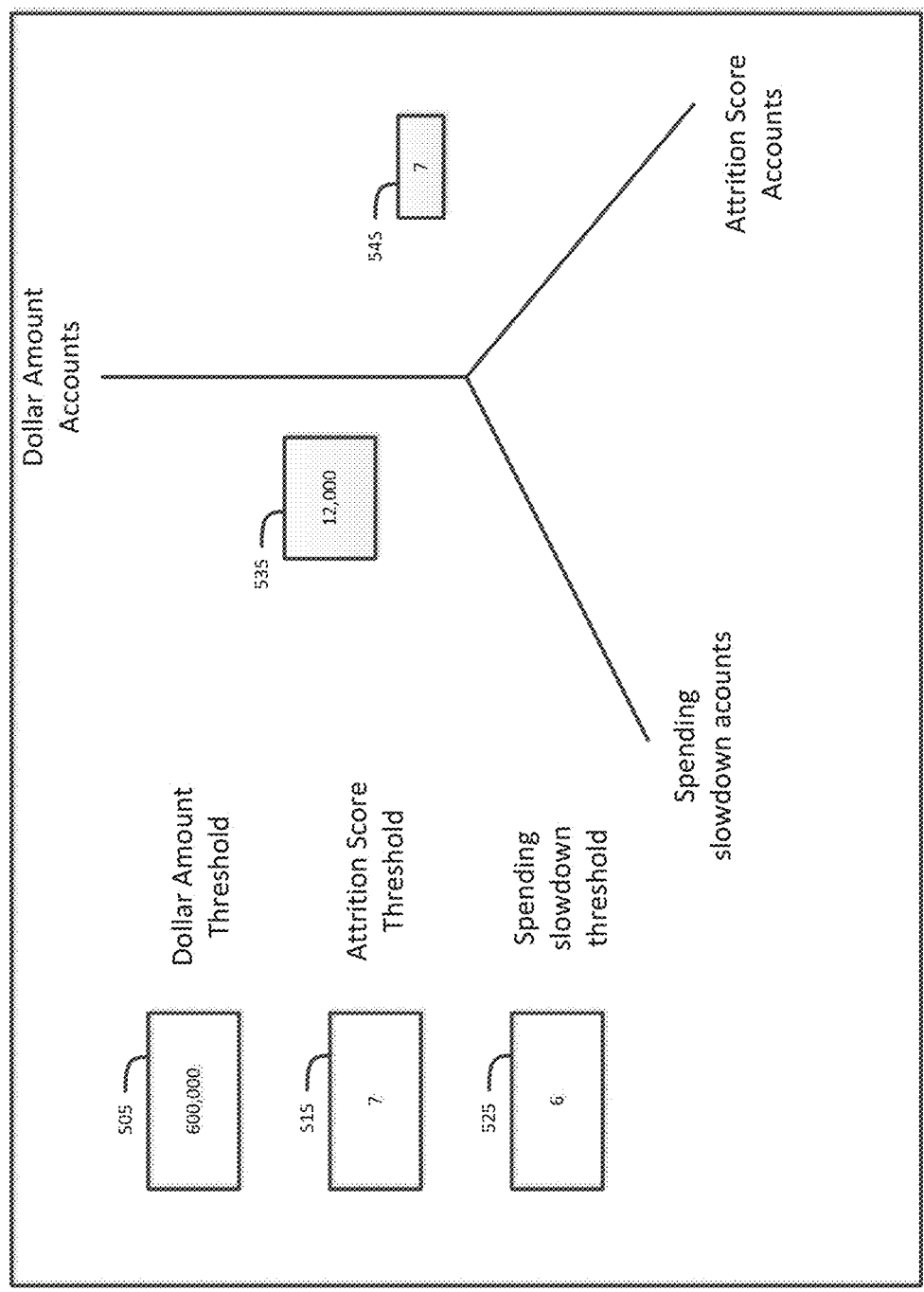
FIG. 5 a user interface to adjust thresholds and graphically view changes in accounts that meet the thresholds.

A user interface may also be provided as part of the system 103 as illustrated in FIG. 5. An administrator may be able to adjust the thresholds for the dollar amount 505, the spending slowdown score 525 and the attrition score 515 to locate the accounts desired. The number of accounts that fit the inputted values may be indicated inside the illustrated graphics 535. In addition, the size of the graphic 545 (in this case, a rectangle) may indicate the size of the pool that meet the set criteria.

Figure 6:
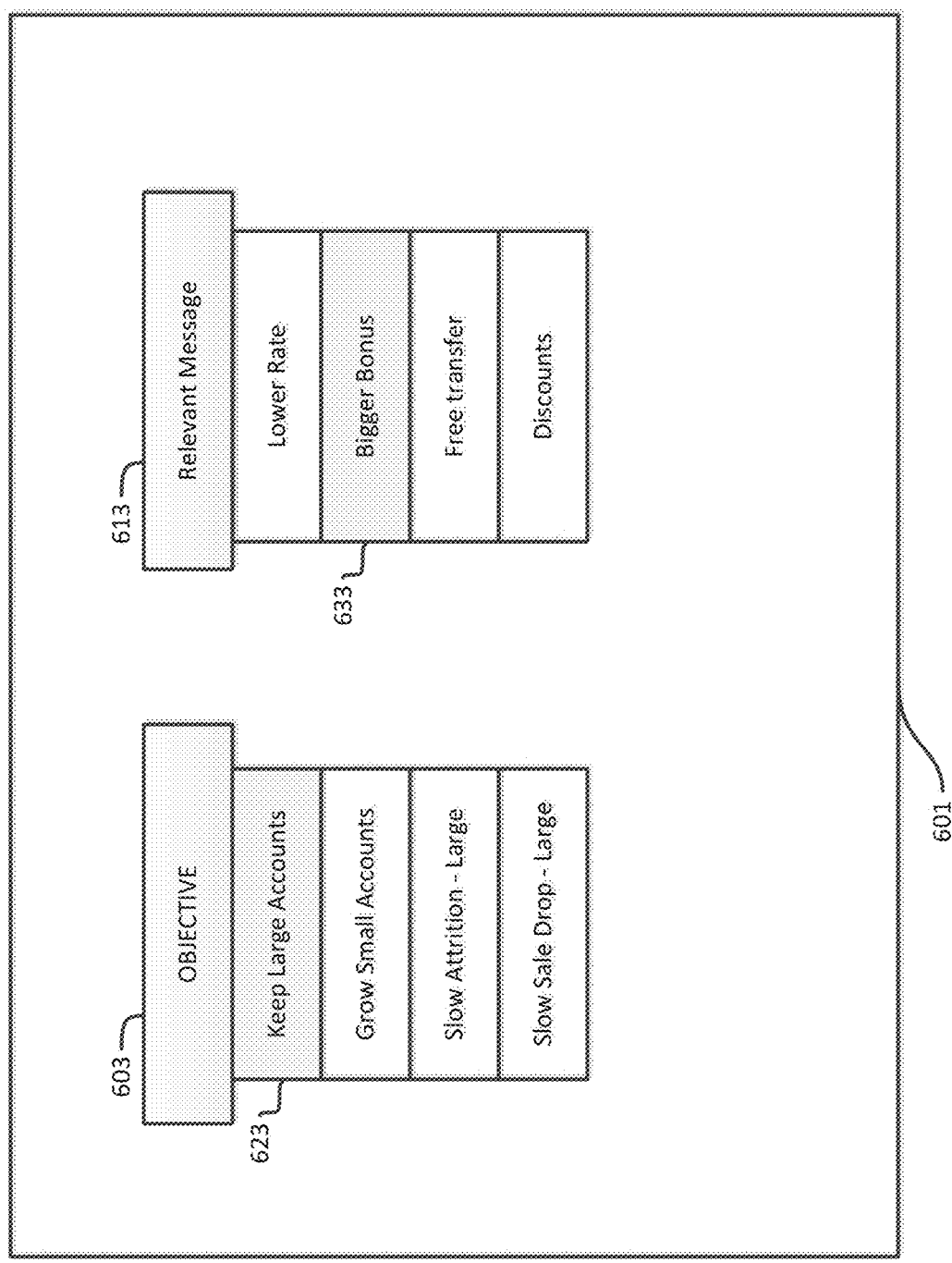
FIG. 6 illustrates a user interface to select an objective and relevant messages for a campaign.

In addition embodiments as illustrated in FIG. 6, a user interface 601 may exist to select delivery objectives 603 of the system 103 and relevant message 613 to be delivered to the account holder. In some embodiments, the preferred or default objective 633 and the preferred or default message 633 may be highlighted for the administrator.

In addition embodiments as illustrated in FIG. 7, a user interface 701 may exist to select delivery options 703 of the system 103 and timing of the message 713 to be delivered to the account holder. In some embodiments, the preferred or default delivery option 723 and the preferred or default timing 733 may be highlighted for the administrator.

FIG. 8 may be a high level illustration of some of the elements a sample computing environment that may be physically configured to implement the various embodiments of the method and its logical variants. A user device 102 in the computing environment may store a software payment application that may be accessed in a variety of ways. There may be various versions of the application to take advantage of the benefits of different computing devices, different languages and different API platforms. In some embodiments, the entire system 103 may be accessed through a portable computing device 102 such as a smart phone and the desired activities directed toward clients may occur using a portable computing device 102.

The user device 102 may have a display 802 which may or may not be a touch sensitive display. More specifically, the display 802 may have a capacitance sensor, for example, that may be used to provide input data to the user device 102. In other embodiments, an input pad 804 such as arrows, scroll wheels, keyboards, etc., may be used to provide inputs to the user device 102. In addition, the user device 102 may have a microphone 806 which may accept and store verbal data, a camera 808 to accept images and a speaker 810 to communicate sounds.

The user device 102 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the POS terminal 104 or through a wireless network, e.g., Bluetooth, etc. FIG. 7 may be a simplified illustration of the physical elements that make up a user device 102 and FIG. 8 may be a simplified illustration of the physical elements that make up the server 104.

FIG. 9 may be a sample user device 102 that is physically configured according to be part of the system. The user device 102 may have a processor 950 that is physically configured according to computer executable instructions. It may have a portable power supply 955 such as a battery which may be rechargeable. It may also have a sound and video module 960 which assists in displaying video and sound and may turn off when not in use to conserve power and battery life. The user device 102 may also have volatile memory 965 and non-volatile memory 970. There also may be an input/output bus 975 that shuttles data to and from the various user input devices such as the microphone 906, the camera 908 and other inputs 902, etc. It also may control of communicating with the networks, either through wireless or wired devices. Of course, this is just one embodiment of the portable computing device 901 and the number and types of portable computing devices 901 is limited only by the imagination.

An example of the physical elements that make up a server 104 such as the transaction server 113, learning server 123, reviewing server 133 and analysis server 143 may be further illustrated in FIG. 10. Some of the physical elements may be located in other devices, depending on processing needs. The POS terminal 104 may have a processor 1000 that is physically configured according to computer executable instructions. It may also have a sound and video module 1005 which assists in displaying video and sound and may turn off when not in use to conserve power and battery life. The POS terminal 104 may also have volatile memory 1010 and non-volatile memory 1015. And as mentioned previously, each server may be physically built to meet the specific identified task.

In some examples, the server 104 may include a digital storage such as a magnetic disk, an optical disk, flash storage, non-volatile storage, etc. Structured data may be stored in the digital storage such as in a database. A database 1025 may be stored in the memory 1010 or 1015 or may be separate. The database 1025 may also be part of a cloud and may be stored in a distributed manner. There also may be an input/output bus 1020 that shuttles data to and from the various user input devices such as the microphone 906, the camera 908, the inputs 902, etc. The input/output bus 1020 also may control of communicating with the networks, either through wireless or wired devices. Of course, this is just one embodiment of the POS terminal 104 and the number and types of user devices 102 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The user devices, terminals, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, terminals, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, terminals, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, terminals, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data transfer. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method comprising:
   receiving purchase data comprising past data of purchases by a plurality of electronic accounts;
   selecting accounts of the plurality of electronic accounts that contain attrition elements determined to predict likelihood of attrition in the near future;
   assigning an attrition score to the accounts selected for containing the attrition elements;
   selecting accounts of the plurality of electronic accounts that contain transaction reduction elements that predict likelihood of transaction reductions in the near future;
   assigning a transaction reduction score to the accounts selected for containing the transaction reduction elements;
   providing a user interface configured for selecting a transaction value threshold, an attrition score threshold, and a transaction reduction score threshold, the user interface being configured to provide a three-dimensional graphical representation of one or more accounts meeting the selected thresholds; and
   determining high risk accounts having a value of transactions over the transaction value threshold, attrition scores above the attrition score threshold, and transaction reduction scores above the transaction reduction score threshold.

2. The method of claim 1 further comprising:
   separating the one or more accounts by spend amount into a plurality of spend levels based on spend;
   separating the one or more accounts by transaction reduction score into a plurality of reduction levels;
   separating the one or more accounts by attrition score into a plurality of attrition levels; and
   for each spend level, creating a matrix with plurality attrition on a first axis, plurality of reductions levels on a second axis and spend levels on a third axis.

3. The method of claim 1 further comprising, in response to an account being determined as being high risk, selecting a message to be communicated to the high risk accounts.

4. The method of claim 3, wherein the message comprises an enticement to use the electronic account.

5. The method of claim 4, wherein the enticement comprises at least one enticement selected from a group comprising: a higher credit limit, bonus rebates, higher percentage cash back, lower interest rates.

6. The method of claim 1 further comprising executing an attrition learning algorithm on the purchase data to determine the attrition elements.

7. The method of claim 6, wherein the attrition learning algorithm reviews a plurality of elements during a study period of n month intervals wherein the elements comprise at least one element selected from a group comprising:
   total present value in month n of the study period;
   percent of change in transactions for month n of study period over a last month of previous time period;
   percent of change in transaction for month n over the first month during study period;
   month-over-month change in everyday present value for month n over month 1 during the study period;
   total online present value for a second quarter of the study period;
   percent of change in recurring present value for month n–2 of study period over month n–2 of previous study period;
   total number of decline during the study window;
   month-over-month change in present value month n in the study period over month n of prior n months period;
   total monthly charge count during the study period;
   month-over-month change in transaction month n in the study period over month n of the prior n months period;
   percent of change in transaction first month of study period over month n of previous n months; and
   month-over-month change in recurring transaction for month n in the study period over month n of the prior n months period.

8. The method of claim 7, wherein action is taken within two time periods of the study period.

9. The method of claim 6, wherein the attrition learning algorithm uses a Treenet based learning algorithm.

10. The method of claim 1 further comprising executing a transaction reduction learning algorithm on the purchase data to determine the transaction reduction elements.

11. The method of claim 9, wherein the learning algorithm to determine transaction reduction elements is based on:
    change in everyday transaction on in second quarter vs first quarter during the study period;
    percent change in transaction 2 quarter vs 1st quarter during the study period;
    month over month change in transaction for month 6 of the study period;
    month over month change in everyday transaction for month 6 of the study period;
    month over month change in everyday transaction for month 5 of the study period;
    number of decline during the study period; and
    month over month change in online transaction for month 5 during the study period.

12. The method of claim 1, wherein the purchase data is merchant specific.

13. A computer-implemented method comprising:
receiving purchase data from a transaction server, the purchase data comprising past data of purchases by a plurality of electronic accounts;
selecting accounts of the plurality of electronic accounts that contain transaction reduction elements that predict likelihood of transaction reductions in the near future;
assigning a transaction reduction score to the accounts selected for containing the transaction reduction elements;
providing a user interface configured for selecting a transaction value threshold and a transaction reduction score threshold, the user interface being configured to provide a graphical representation of one or more accounts meeting the selected thresholds;
determining high value accounts having a value of transactions over the transaction value threshold; and
determining high risk accounts from the high value accounts wherein the high risk accounts have a value of transactions over the transaction value threshold and transaction reduction scores above the transaction reduction score threshold.

14. The method of claim 13 further comprising:
separating the one or more accounts by spend amount into a plurality of spend levels based on spend;
separating the one or more accounts by transaction reduction score into a plurality of reduction levels; and
for each spend level, create a matrix with plurality reductions on a first axis and spend levels on a second axis.

15. The method of claim 13 further comprising, in response to an account being determined as being high risk, selecting a message to be communicated to the high risk accounts.

16. The method of claim 15, wherein the message comprises an enticement to use the electronic account.

17. The method of claim 16, wherein the enticement comprises at least one enticement selected from a group comprising: a higher credit limit, bonus rebates, higher percentage cash back, lower interest rates.

18. The method of claim 13 further comprising executing a transaction reduction learning algorithm on the purchase data to determine the transaction reduction elements.

19. The method of claim 18, wherein the learning algorithm to determine transaction reduction elements is based on:
change in everyday transaction on in second quarter vs first quarter during the study period;
percent change in transaction 2 quarter vs 1st quarter during the study period;
month over month change in transaction for month 6 of the study period;
month over month change in everyday transaction for month 6 of the study period;
month over month change in everyday transaction for month 5 of the study period;
number of decline during the study period; and
month over month change in online transaction for month 5 during the study period.

20. The method of claim 13 further comprising assigning an attrition score to the accounts selected for containing attrition elements determined to predict likelihood of attrition in the near future, wherein the user interface is further provided for selecting an attrition score threshold.

* * * * *